US012449828B1

(12) United States Patent
Mastrocola

(10) Patent No.: US 12,449,828 B1
(45) Date of Patent: Oct. 21, 2025

(54) FUEL SYSTEM WITH BOOSTED AND COOLED VARIABLE DISPLACEMENT MAIN FUEL PUMP AND ELECTROMECHANICAL ACTUATORS

(71) Applicant: Hamilton Sundstrand Corporation, Charlotte, NC (US)

(72) Inventor: Naison Mastrocola, Goshen, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 5 days.

(21) Appl. No.: 18/642,162

(22) Filed: Apr. 22, 2024

(51) Int. Cl.
*G05D 16/20* (2006.01)
*F02C 7/236* (2006.01)
*F02C 7/32* (2006.01)

(52) U.S. Cl.
CPC ............ *G05D 16/208* (2013.01); *F02C 7/236* (2013.01); *F02C 7/32* (2013.01); *Y10T 137/86002* (2015.04); *Y10T 137/86027* (2015.04)

(58) Field of Classification Search
CPC ......... G05D 16/208; F02C 7/236; F02C 7/32; Y10T 137/86002; Y10T 137/86027
USPC ........................................ 137/565.13, 565.16
See application file for complete search history.

(56) References Cited

U.S. PATENT DOCUMENTS

| | | | | | |
|---|---|---|---|---|---|
| 3,801,228 | A * | 4/1974 | Mueller | F04B 23/12 | 417/282 |
| 4,245,964 | A * | 1/1981 | Rannenberg | F04C 14/02 | 60/734 |
| 5,116,362 | A * | 5/1992 | Arline | F02C 7/236 | 60/734 |
| 5,118,258 | A * | 6/1992 | Martin | F02C 7/236 | 60/734 |
| 5,241,826 | A * | 9/1993 | Stearns | F02C 7/236 | 60/734 |
| 5,865,602 | A | 2/1999 | Nozari | | |
| 6,487,847 | B1 * | 12/2002 | Snow | F02K 3/10 | 60/764 |
| 6,810,674 | B2 | 11/2004 | Clements | | |
| 7,401,461 | B2 | 7/2008 | Eick et al. | | |
| 7,770,388 | B2 * | 8/2010 | Desai | F02C 7/236 | 60/420 |
| 8,166,765 | B2 * | 5/2012 | Baker | F02C 9/30 | 60/734 |
| 8,434,301 | B2 | 5/2013 | Fukui | | |
| 8,572,974 | B2 * | 11/2013 | Veilleux, Jr. | F02C 9/30 | 60/734 |
| 8,869,509 | B2 * | 10/2014 | Baker | F04B 49/22 | 60/424 |
| 9,453,463 | B2 * | 9/2016 | Zielinski | F02C 7/236 | |
| 9,850,917 | B2 | 12/2017 | Mueller et al. | | |
| 11,060,461 | B2 | 7/2021 | Turney et al. | | |
| 11,267,580 | B2 | 3/2022 | Mastrocola et al. | | |
| 11,441,485 | B2 | 9/2022 | Herring | | |

(Continued)

*Primary Examiner* — William M McCalister
(74) *Attorney, Agent, or Firm* — Kinney & Lange, P.A.

(57) ABSTRACT

A fluid system includes a boost pump and a variable displacement pump along a main leg configured to output fluid within a pressure range and at variable flow rates. An auxiliary leg of the fluid system includes an auxiliary pump configured to receive a portion of the fluid from the main leg and to output pressurized fluid to a control valve of the variable displacement pump and multiple actuator modules. Each actuator module includes an electromechanical actuator and a collocated control unit.

18 Claims, 2 Drawing Sheets

(56) References Cited

U.S. PATENT DOCUMENTS

| | | | | |
|---|---|---|---|---|
| 11,708,795 | B1 * | 7/2023 | Mastrocola | F02C 7/14 60/39.281 |
| 11,713,724 | B1 * | 8/2023 | O'Rorke | F02C 9/28 60/772 |
| 11,976,599 | B1 * | 5/2024 | Susca | F04B 49/22 |
| 2005/0016176 | A1 * | 1/2005 | Griffiths | F02C 9/28 60/734 |
| 2008/0289338 | A1 * | 11/2008 | Desai | F04C 14/02 60/734 |
| 2010/0097040 | A1 * | 4/2010 | Boisvert | F15B 21/08 417/1 |
| 2013/0192244 | A1 * | 8/2013 | Ripley | F02C 7/32 60/776 |
| 2018/0163637 | A1 * | 6/2018 | Griffiths | F02C 7/232 |
| 2018/0340501 | A1 | 11/2018 | Ni et al. | |
| 2020/0256258 | A1 * | 8/2020 | Duong | F02C 7/32 |
| 2021/0340936 | A1 * | 11/2021 | O'Connor | F02M 27/02 |
| 2023/0130997 | A1 | 4/2023 | Rutar et al. | |

* cited by examiner

FUEL SYSTEM WITH BOOSTED AND COOLED VARIABLE DISPLACEMENT MAIN FUEL PUMP AND ELECTROMECHANICAL ACTUATORS

BACKGROUND

This disclosure relates to pressure-controlled pump systems and, more particularly, to pressure-controlled pump systems that include thermal management for actuators. In traditional pressure-controlled pump systems, pumps supply fluid to actuators among other potential system components. The variability of pressure and flow of fluid within system attributed to actuators can cause pumps to be oversized to accommodate a limiting operating condition of the system. Further, thermal conditions surrounding the actuator may impact operability and service life of the actuators. However, there is still a need in the art for improvements. The present disclosure addresses these shortcomings.

SUMMARY

A fluid system in accordance with this disclosure includes an inlet line, a boost pump, a boost line, a variable displacement pump, an auxiliary pump, a control valve, and actuator modules. The boost pump is connected to the inlet line to receive input flow. The boost line is connected to an outlet of the boost pump. The variable displacement pump is connected to the boost line to receive the input flow The variable displacement pump includes a valve element operable to vary an output of the variable displacement pump and a valve actuator connected to the valve element. The auxiliary pump is connected to the boost line and configured to output an actuator pressure. The control valve is connected to the auxiliary pump and to control lines of the variable displacement pump, wherein the control valve is operable to vary a position of the valve element via displacement of the valve actuator. The actuator modules include a control unit collocated with an actuator.

In a further example of the fluid system, the auxiliary pump can be rotated independently of the boost pump and the variable displacement pump.

In another further example, at least one of the actuator modules can be located in a high temperature environment in which a temperature exceeds a temperature rating of the control unit, the actuator, or both the control unit and the actuator of the actuator module.

DETAILED DESCRIPTION

Figure 1:
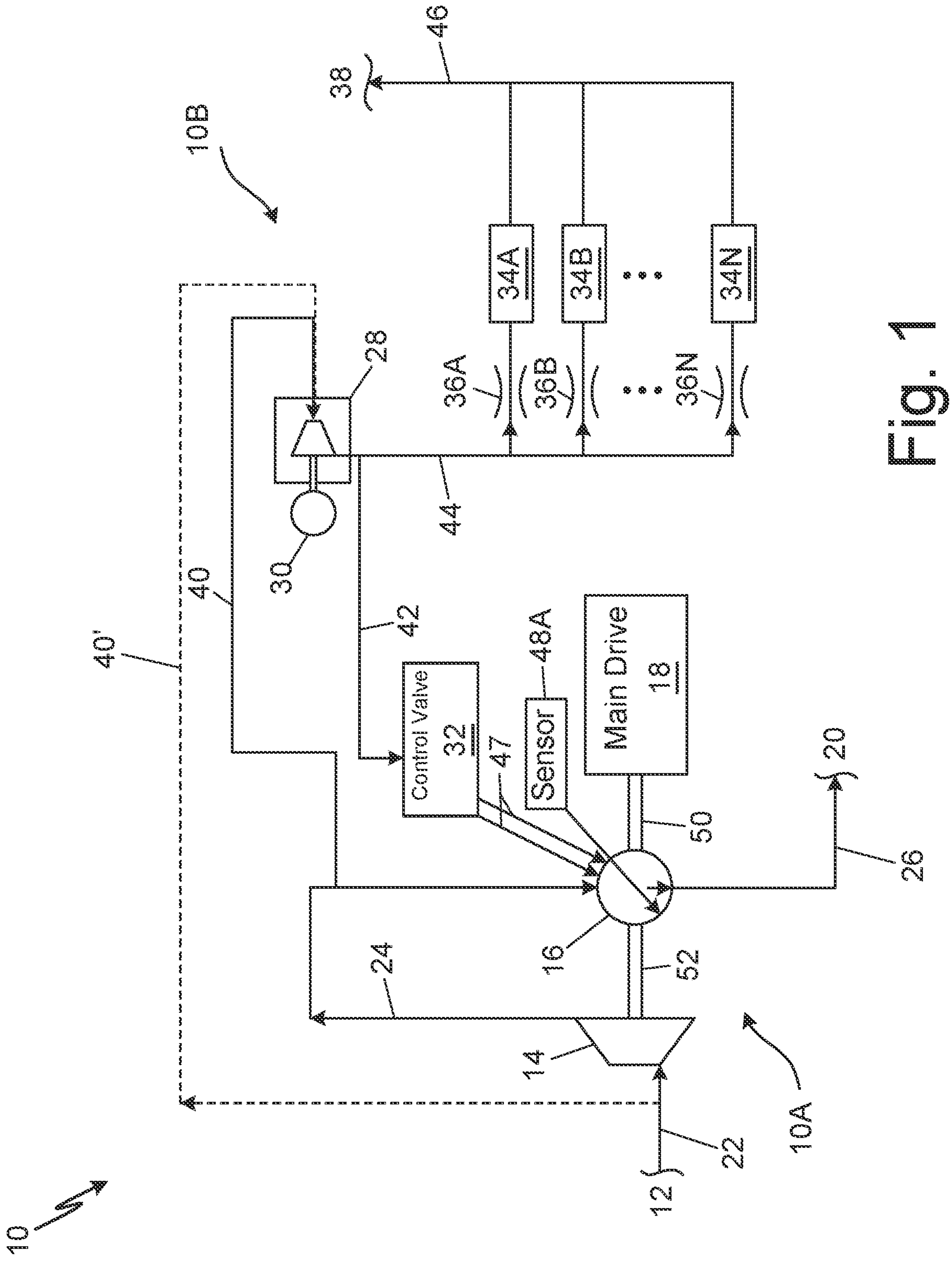
FIG. 1 is a schematic view of an example fluid system that includes a main leg configured to provide a controlled flow rate of pressurized fluid and an auxiliary leg configured to provide a pressurized supply of fluid to a control valve and multiple actuators.

FIG. 1 is a schematic view of a fluid system that supplies fluid at a target pressure, or target pressure range, to at least one downstream component. Fluid system 10 includes inlet 12, boost pump 14, variable displacement pump 16, main drive 18, main discharge 20 connected in series by inlet line 22, boost line 24, and main line 26 to form main leg 10A. Fluid system 10 further includes auxiliary pump 28, auxiliary drive 30, control valve 32, actuator modules 34A-34N, orifices 36A-36N, and actuator discharge 38 interconnected by auxiliary line 40, valve line 42, actuator line 44, and discharge line 46 to form auxiliary leg 10B. Components of main leg 10A provide a boosted and controlled variable displacement fluid output to main discharge 20. Components of auxiliary leg 10B receive a portion of fluid from main leg 10A that is distributed between control valve 32, which operates to vary an output flow of main leg 10A, and actuator modules 34A-34N, which operate displace one or more other variable geometry components operatively associated with fluid system 10. In certain examples, fluid system 10 can include additional components not shown in FIG. 1 which are described below in reference to FIG. 2.

Boost pump 14 and variable displacement pump 16 are fluidly connected in series to provide a pressurized, controlled displacement of fluid from inlet 12 to main discharge 20 along main leg 10A. Inlet line 22 fluidly connects an inlet of boost pump 14 to inlet 12. Boost line 24 fluidly connects an outlet of boost pump 14 to an inlet 12 of variable displacement pump 16. An outlet of variable displacement pump 16 fluidly connects to main discharge 20 via main line 26.

Boost pump 14 is any suitable pump operable to increase fluid pressure within inlet line 22 to within a boost pressure range of boost line 24. In some examples, a majority of the pressure rise along main leg 10A is produced by boost pump 14 while variable displacement pump 16 produces a minor portion of the pressure rise along main leg 10A. Examples of boost pump 14 include non-positive displacement pumps and positive displacement pumps and can be mechanically driven and/or electrically driven. In some examples, boost pump 14 can be a centrifugal pump, or other non-positive displacement pump, that is mechanically-driven by main drive 18.

Variable displacement pump 16 is any suitable pump operable to vary a fluid output in response to a position of a valve element. For example, variable displacement pump 16 can be a vane pump with variable displacement output based on the position of a cam ring, which is displaced by a valve actuator (e.g., a piston or other valve actuator). Variable displacement pump can include sensor 48A that outputs a signal indicative of a position of the valve element. In some examples of fluid system 10, sensor 48A is a linear variable displacement transducer (LVDT) configured to output a signal indicative of the valve actuator position, which is proportional to a position of the valve element.

Boost pump 14 and variable displacement pump 16 are rotationally coupled to main drive 18 via coupling 50 and coupling 52. In some examples, coupling 50 and coupling 52 are shafts interconnecting main drive 18 to variable displacement pump 16, and interconnecting variable displacement pump 16 to boost pump 14 respectively. In other examples, coupling 50 and coupling 52 can be any other suitable rotational coupling formed by any one or more of shafts, gears, belts, chains, or other mechanical couplers.

Main drive 18 is an engine, an electric machine, or a component thereof operatively associated with fluid system 10. In some examples, main drive 18 is an output shaft of a gearbox, which is driven by an engine or an electric machine. In other examples, main drive 18 can be directly coupled to the engine or electric machine.

Auxiliary pump 28 and auxiliary drive 30 receive a portion of fluid from main leg 10A via auxiliary line 40 to provide pressurized fluid supply to control valve 32 and actuator modules 34A-34N. Auxiliary line 40 fluidly connects an inlet of auxiliary pump 28 to boost line 24 to receive fluid pressurized by boost pump 14. Alternatively, auxiliary pump 28 can be fluidly connected to inlet line 22 upstream from boost pump 14 as represented by alternative auxiliary line 40'.

Auxiliary drive 30 rotates auxiliary pump 28 independently of main drive 18. For example, auxiliary drive 30 can be an electric machine that receives power from main drive 18, or an energy storage system operatively associated with main drive 18. Auxiliary pump 28 can be any pump suitable for increasing fluid pressure from within boost line 24 or alternatively, from within inlet line 22 to an actuator pressure and/or a valve pressure. Examples of auxiliary pump 28 include non-positive displacement pumps and positive displacement pumps.

Control valve 32 can be an electro-hydraulic servo valve (EHSV) operable to control a position of the valve element of variable displacement pump 16 via valve actuator. For instance, control valve 32 can be a 4/2 electro-hydraulic servo valve (EHSV) in which flow is selectively supplied to valve actuator. Displacement of valve actuator causes proportional displacement of valve element and, hence, varies an output of variable displacement pump 16.

Auxiliary pump 28 and auxiliary drive 30 supply pressurized fluid to control valve 32 and actuator modules 34A-34N. Control valve 32 and actuator modules 34A-34N are fluidly connected in parallel to an outlet of auxiliary pump 28. Control valve 32 receives fluid from auxiliary pump 28 via valve line 42 and selectively varies flow through control lines 47 in order to vary a fluid output from variable displacement pump 16. Actuator modules 34A-34N receive fluid from auxiliary pump 28 in order to vary a position of one or more respective components operatively associated with fluid system 10.

Fluid system 10 includes actuator module 34A, actuator module 34B, and up to actuator module 34N, in which "N" denotes an arbitrary number of actuator modules 34A-34N. Each of actuator modules 34A-34N can include an electromechanical actuator (EMA) and a control unit collocated with the electromechanical actuator. Electromechanical actuators can be a linear EMA or a rotary EMA that are coupled to one or more variable geometry components operatively associated with fluid system 10. Control units can include a processor, a microprocessor, a controller, a digital signal processor (DSP), an application specific integrated circuit (ASIC), a field-programmable gate array (FPGA), or other equivalent discrete or integrated logic circuitry that governs operation of respective electromechanical actuators. Control units can be associated with a temperature rating above which operation life of control unit is degraded or non-operative.

At least one and up to all actuator modules 34A-34N can be located in a high temperature thermal environment such that electromechanical actuators and/or control units could be exposed to a temperature exceeding a thermal rating. Fluid directed through or across actuator modules 34A-34N cools electromechanical actuator and/or control unit and is routed to actuator discharge 38. Actuator discharge 38 can be fluidly connected to inlet 12 in order to recirculate fluid in some examples. In certain examples, actuator discharge 38 can be fluidly connected to another location along inlet line 22 between inlet 12 and boost pump 14, or between boost pump 14 and variable displacement pump along boost line 24.

The fluid pressure and relative flow rates to actuator modules 34A-34N is limited by an equal number of orifices 36A-36N. Each of orifices 36A-36N is positioned upstream from a respective actuator module 34A-34N. That is to say, each of orifices 36A-36N is fluidly connected between an outlet of auxiliary pump 28 and respective actuator modules 34A-34N. Sizes of respective orifices 36A-36N can be selected to limit flow to each actuator module 34A-34N and/or to proportion flow from auxiliary pump 28 among actuator modules 34A-34N as necessary for proper operation of fluid system 10.

In operation, main drive 18 rotates boost pump 14 and variable displacement pump 16 within a speed range. Boost pump 14 increases fluid pressure from a nominal level within inlet line 22 to a boost pressure within boost line 24. Variable displacement pump 16 provides pressurized fluid at a variable flow rate to main line 26 as a function of a position of the valve element, which is actuated by control valve 32, control lines 47, and valve actuator. Accordingly, main leg 10A provides fluid to main line 26 within a target pressure range and within a target flow rate based on a speed of main drive 18 and a valve element position.

Auxiliary drive 30 rotates auxiliary pump 28 to pressurize fluid received from main leg 10A that discharges into auxiliary leg 10B. Auxiliary pump 28 can be varied to maintain a constant pressure in valve line 42 and actuator line 44 in proportion to a demand of variable displacement pump 16. During shutdown or reduced flow operation of fluid system 10, auxiliary pump 28 protects actuator modules 34A-34N from thermal soak back by flowing fluid through actuator modules 34A-34N when boost pump 14 and variable displacement pump 16 are not operating or operating at a speed lower than normal operation, for example, during shutdown of fluid system 10 and/or shutdown of main drive 18. Fluid flowing through or across actuator lines protects actuator modules 34A-34N by reducing temperature of electromechanical actuators and/or collocated control units.

Figure 2:
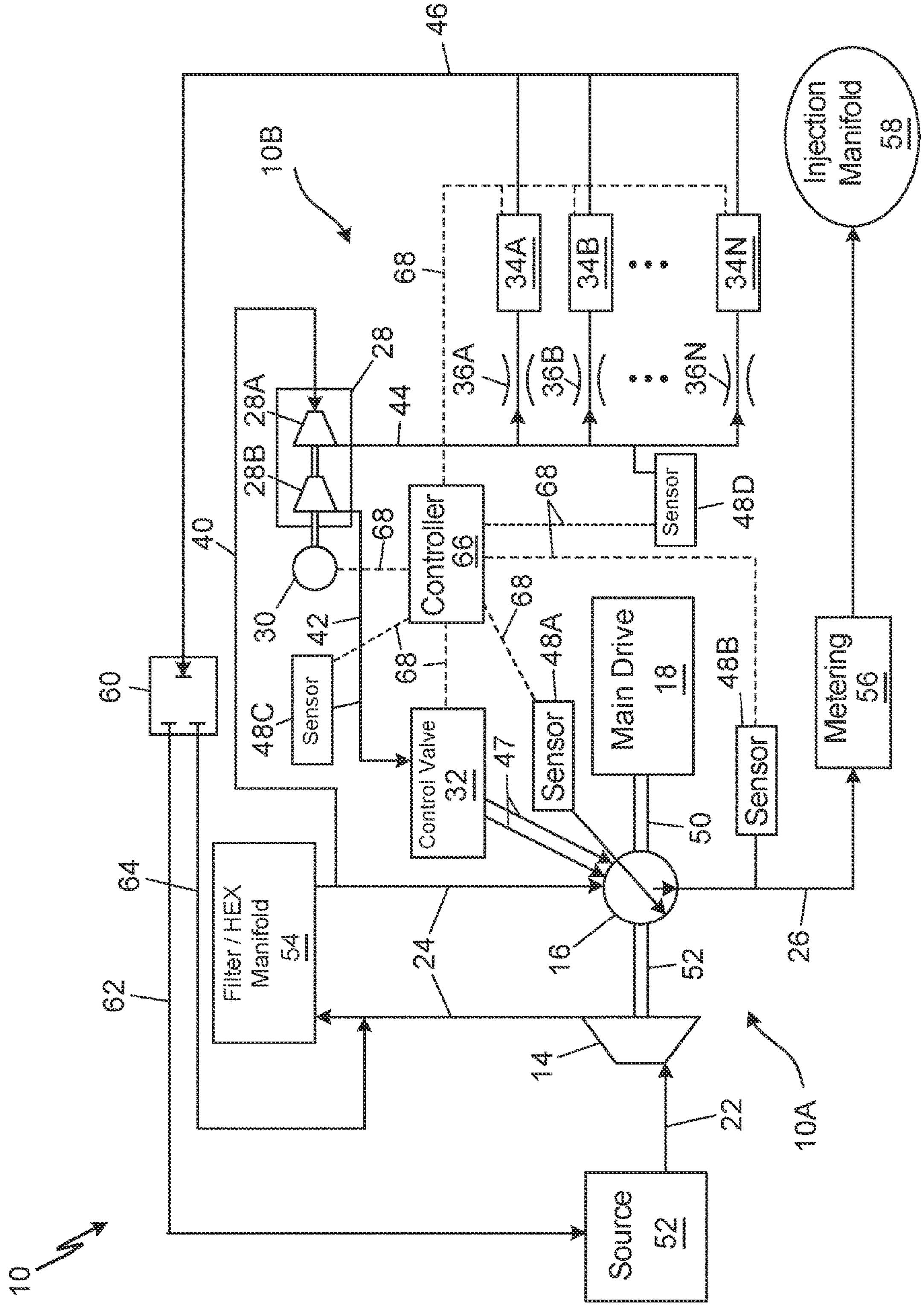
FIG. 2 is a schematic view that depicts additional components and features of the fluid system of FIG. 1.

FIG. 2 is a schematic view depicting additional components of fluid system 10.

Main leg 10A and associated components boost pump 14, variable displacement pump 16, main drive 18, inlet line 22, boost line 24, and main line 26 are shown. Auxiliary leg 10B and associated components auxiliary pump 28, auxiliary drive 30, control valve 32, actuator modules 34A-34N, orifices 36A-36N, auxiliary line 40, valve line 42, actuator line 44, discharge line 46, and control lines 47 are also shown.

As depicted, fluid system 10 is a fuel system for a gas turbine engine that includes one or more of fluid source 52, filter manifold 54, metering valve 56, injection manifold 58, a multistage variant of auxiliary pump 28, selector valve 60, return line 62, recirculation line 64, controller 66, and communication links 68. While FIG. 2 depicts an example system incorporating each of the foregoing components, it is understood that examples of fluid system 10 can be augmented with any one of the additional components, or any combination of additional components described in reference to FIG. 2.

Fluid source 52 can be a tank, a container, a pressure vessel, or other storage container that retains fluid of system 10. Fluid source 52 fluidly connects to inlet line 22 to supply fluid to boost pump 14. In some examples, fluid source 52 may receive fluid discharged from actuator modules 34A-34N along discharge line 46 and return line 62.

Filter and heat exchanger manifold 54 is disposed along boost line 24 between boost pump 14 and variable displacement pump 16. Filter and heat exchanger manifold 54 can include a series of one or more filters that operate to reduce or eliminate particulate within fluid. Further, manifold 54 can function as or include a heat exchanger such that fluid flowing through manifold 54 is placed in a heat exchange relationship with another medium for heating and/or cooling the fluid. Examples heat exchanger mediums can include air and lubricating fluid, among other potential fluids. In further examples, heat exchanger can include a heat sink (e.g., an engine casing or housing), among other potential sinks, such that the fluid and medium can be spaced by greater distances than a conventional heat exchanger arrangement. During certain operational conditions of fluid system 10, for instance, a low temperature of fluid within fluid source 52 may require heating prior to entering filters of manifold 54 to prevent icing and blockage. In this case, operation of boost pump 14 and/or heat from lubrication oil, or another source, can be imparted to fluid via a heat exchanger of manifold 54. In another instance, variable displacement pump 16 can be associated with a bypass circuit that recirculates fluid through boost pump 14 and/or filter and heat exchanger manifold 54 to increase fluid temperature prior to operation of gas turbine engine.

Main line 26 can be fluidly connected to metering valve 56 and injection manifold 58 associated with the gas turbine engine fuel system. Metering valve 56 can be a throttling valve that varies valve position to produce a pressure drop along main line 26, the pressure drop operable to vary a flow rate of fluid delivered to injection manifold 58. In other examples, metering valve 56 can be associated with a bypass arrangement in which a valve element position varies in order to divide flow between main line 26 and a bypass line (not shown) that returns excess fluid to fluid source 52, or to another location along inlet line 22 or boost line 24. Injection manifold 58 can be a pressurized distribution manifold that is fluidly connected to one or more injectors of gas turbine engine.

Auxiliary pump 28 can be a single stage pump (e.g., as shown in FIG. 1) or can be a multistage pump comprising at least first stage 28A and second stage 28B. In other examples, auxiliary pump 28 can include more than two stages, for example, three pump stages. In other examples, one or both of first stage 28A and second stage 28B can be representative of multiple stages. For example, first stage 28A can be a single stage while second stage 28B may represent two or more stages. However auxiliary pump 28 is configured, it is understood that fluid can be discharged from auxiliary pump 28 at multiple locations, each location corresponding to one of the stages of auxiliary pump 28. In this way, actuator modules 34A-34N and control valve 32 can receive fluid at different pressures rather than a common pressure as shown in FIG. 1. As depicted in FIG. 2, actuator line 44 communicates with first stage 28A and valve line 42 communicates with second stage 28B. In this way, control valve 32 can receive fluid at a higher pressure than fluid received by actuator modules 34A-34N, if so desired.

Selector valve 60 includes at least one inlet port and two outlet ports. The inlet port of selector valve 60 communicates with actuator discharge 38 and receives flow therefrom. A first outlet port of selector valve 60 communicates with return line 46, which fluidly connects selector valve 60 to fluid source 52. A second outlet port communicates with recirculation line 64, which fluidly connects selector valve to boost line 24. For examples of fluid system 10 that include filter manifold 54, recirculation line 64 may fluidly connect selector valve 60 to a location upstream from filter manifold 54 and downstream from boost pump 14 (e.g., between filter manifold 54 and boost pump 14). In some examples, selector valve 60 may alternatively connect actuator return flow to fluid source 52 and boost line 24. In other examples, selector valve 60 may divide actuator return flow between fluid source 52 and boost line 24 based on a temperature and/or pressure of fluid within system 10, or an operating condition of boost pump 14 and/or variable displacement pump 16.

Controller 66 is an electronic device that is connected to one or more sensors 44A-44D, control valve 32, metering valve 56, auxiliary drive 30, and/or actuator modules 34A-34N via a wireless and/or a wired connection as indicated by communication links 68. Controller 66 can be a computer, an engine control unit, a control unit integrated with an engine control unit, a control unit discrete from an engine control unit, and a full authority digital engine (or electronics) controller, among other possible examples. While the following disclosure refers to a controller (singular), the method and functions attributed to a single controller can be distributed among multiple controllers 66 in other examples. That is, functionality attributed herein to controller 66 can, in certain examples, be distributed among multiple controllers 66.

Controller 66 can be used operate variable displacement pump 16, auxiliary drive 30, and or actuator modules 34A-34N based on a control scheme and feedback received from one or more sensors 44A, 44B, 44C, and 44D. Any suitable control scheme is contemplated herein. For example, controller 66 can vary fluid output from variable displacement pump 16 based on position sensor 44A and pressure sensor 44B. Position sensor 44A is a linear variable displacement transducer (LVDT) that outputs a signal representative of a position of valve actuator. Pressure sensor 44B is a transducer that outputs a signal representative of a static gage pressure in main line 26 downstream from variable displacement pump 16. Further, controller 66 may vary rotational speed of auxiliary pump 28 based pressure sensor 44C and/or pressure sensor 44D. Both pressure sensor 44C and pressure sensor 44D are pressure transducers outputting signal representative of a static gauge pressure. The signal output from pressure sensor 44C is indicative of a static gauge pressure within valve line 42 in route to control valve 32 whereas the signal output from pressure sensor 44D is indicative of a static gauge pressure within actuator line 44 in route to actuator modules 34A-34N.

During operation of gas turbine engine, main drive 18 (e.g., an output shaft of an accessory gearbox) rotates boost pump 14 and variable displacement pump 16 within an operational speed range proportional to a rotational speed of a spool of gas turbine engine. Boost pump 14 increases fluid pressure from a nominal level within inlet line 22 to a boost pressure within boost line 24. Variable displacement pump 16 provides pressurized fluid at a variable flow rate to main line 26 as a function of a position of the valve element, which is actuated by control valve 32. Accordingly, main leg 10A provides fluid to main line 26 within a target pressure range and within a target flow rate based on a speed of main drive 18 and a valve element position. Fluid (e.g., fuel) is regulated by metering valve 56 before discharging into a combustor of gas turbine engine via injection manifold 58 and associated fuel injectors.

While gas turbine engine operates, auxiliary drive 30 (i.e., an electric machine) rotates auxiliary pump 28 to pressurize fluid from main leg 10A that discharges into auxiliary leg 10B. A speed of auxiliary pump 28 can be varied to maintain a constant pressure in valve line 42 and actuator line 44 as flow output by variable displacement pump 16 varies. Actuator modules 34A-34N are cooled during operation to protect electromechanical actuators and/or control units from heat generated by the gas turbine engine operation (e.g., combustion and additional heat generated by components of gas turbine engine).

During shutdown or reduced flow operation of gas turbine engine and fluid system 10, heat generated by combustion and/or other components of gas turbine engine conducts and radiates to adjacent gas turbine components (e.g., soak back). After shutdown or reduced operation of fluid system 10, auxiliary pump 28 continues to operate in order to provide a flow of fluid through actuator modules 34A-34N. Fluid flowing through or across actuator lines protects actuator modules 34A-34N by reducing temperature of electromechanical actuators and/or collocated control units. Further, with the inclusion of auxiliary pump 28 and auxiliary drive 30, a capacity of variable displacement pump 16 can be reduced relative to a demand associated with actuator modules 34A-34N.

DISCUSSION OF POSSIBLE EMBODIMENTS

The following are non-exclusive descriptions of possible embodiments of the present invention.

Fluid System with Boosted and Cooled Variable Displacement Pump

A fluid system according to an example embodiment of this disclosure includes, among other possible things, an inlet line, a boost pump, a boost line, a variable displacement pump, an auxiliary pump, a control valve, and a plurality of actuator modules. The boost pump is connected to the inlet line to receive input flow. The boost line is connected to the outlet of the boost pump. The variable displacement pump is connected to the boost line to receive the input flow. The variable displacement pump includes a valve element and a valve actuator. The valve element is operable to vary output of the variable displacement pump. The valve actuator is connected to the valve element. The control valve is connected to the auxiliary pump and to control lines of the variable displacement pump. The control valve is operable to vary position of the valve element via displacement of the valve element. Each of the plurality of actuator modules includes a control unit collocated with an actuator.

The fluid system of the preceding paragraph can optionally include, additionally and/or alternatively, any one or more of the following features, configurations and/or additional components:

A further embodiment of the foregoing fluid system, wherein at least one actuator module of the plurality of actuator modules can be located in a high temperature environment having a temperature that exceeds a temperature rating of the at least one actuator module.

A further embodiment of any of the foregoing fluid systems, wherein each actuator of the plurality of actuators can be coupled to a variable geometry component.

A further embodiment of any of the foregoing fluid systems, wherein displacement of the actuator can vary a position of the variable geometry component.

A further embodiment of any of the foregoing fluid systems can include an auxiliary drive rotationally coupled to the auxiliary pump.

A further embodiment of any of the foregoing fluid systems, wherein the auxiliary drive can include an electric machine.

A further embodiment of any of the foregoing fluid systems can include a fluid source fluidly connected to the inlet line.

A further embodiment of any of the foregoing fluid systems can include a return line fluidly connected to the fluid source.

A further embodiment of any of the foregoing fluid systems can include an actuator discharge fluidly connecting outlets of the plurality of actuators to the return line.

A further embodiment of any of the foregoing fluid systems can include a recirculation line fluidly connected to the boost line.

A further embodiment of any of the foregoing fluid systems can include a selector valve that selectively connects the actuator discharge to the recirculation line and the return line.

A further embodiment of any of the foregoing fluid systems, wherein the auxiliary pump can operate independently of the boost pump and the variable displacement pump.

A further embodiment of any of the foregoing fluid systems can be a control line fluidly connecting the control valve to the auxiliary pump.

A further embodiment of any of the foregoing fluid systems can include a sensor configured to output a control pressure signal indicative of a fluid pressure within the control line.

A further embodiment of any of the foregoing fluid systems, wherein the controller can vary the rotational speed of the auxiliary drive to maintain the pressure within the control line constant.

A further embodiment of any of the foregoing fluid systems can include a sensor configured to output a pump pressure signal indicative of a fluid pressure downstream of an outlet of the variable displacement pump.

A further embodiment of any of the foregoing fluid systems can include a controller configured to vary a position of the valve element based on the pump pressure signal by selectively supplying fluid to the valve actuator.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid system comprising:
- an inlet line;
- a boost pump connected to the inlet line to receive input flow;
- a boost line connected to an outlet of the boost pump;
- a variable displacement pump connected to the boost line to receive the input flow, the variable displacement pump comprising:
  - a valve element operable to vary an output of the variable displacement pump; and
  - a valve actuator connected to the valve element;
- an auxiliary pump connected to the boost line and configured to output an actuator pressure;
- a control valve connected to the auxiliary pump and to control lines of the variable displacement pump, wherein the control valve is operable to vary a position of the valve element via displacement of the valve actuator; and
- a plurality of actuator modules, each actuator module comprising a control unit collocated with an actuator.

2. The fluid system of claim 1, wherein at least one actuator module of the plurality of actuator modules is located in a high temperature environment having a temperature that exceeds a temperature rating of the at least one actuator module.

3. The fluid system of claim 1, wherein each actuator of the plurality of actuators is coupled to a variable geometry component, and wherein displacement of the actuator varies a position of the variable geometry component.

4. The fluid system of claim 1, further comprising:

an auxiliary drive rotationally coupled to the auxiliary pump, wherein the auxiliary drive includes an electric machine.

5. The fluid system of claim 1, further comprising:

a fluid source fluidly connected to the inlet line;

a return line fluidly connected to the fluid source; and an actuator discharge fluidly connecting outlets of the plurality of actuators to the return line.

6. The fluid system of claim 5, further comprising:

a recirculation line fluidly connected to the boost line; and a selector valve that selectively connects the actuator discharge to the recirculation line and the return line.

7. The fluid system of claim 1, wherein the auxiliary pump is operable independently of the boost pump and the variable displacement pump.

8. The fluid system of 7, further comprising:

a control line fluidly connecting the control valve to the auxiliary pump;

a sensor configured to output a control pressure signal indicative of a fluid pressure within the control line; and a controller configured to vary a rotational speed of the auxiliary drive and the auxiliary pump based on the control pressure signal.

9. The fluid system of 8, wherein the controller varies the rotational speed of the auxiliary drive to maintain the pressure within the control line constant.

10. The fluid system of claim 1, further comprising:

a sensor configured to output a pump pressure signal indicative of a fluid pressure downstream of an outlet of the variable displacement pump; and a controller configured to vary a position of the valve element based on the pump pressure signal by selectively supplying fluid to the valve actuator.

11. A fluid system comprising:

an inlet line;

a boost pump connected to the inlet line to receive input flow;

a boost line connected to an outlet of the boost pump;

a variable displacement pump connected to the boost line to receive the input flow, the variable displacement pump comprising:

a valve element operable to vary an output of the variable displacement pump; and a valve actuator connected to the valve element;

an auxiliary pump connected to the boost line and configured to output an actuator pressure, wherein the auxiliary pump is operable independently of the boost pump and the variable displacement pump;

a control valve connected to the auxiliary pump and to control lines of the variable displacement pump, wherein the control valve is operable to vary a position of the valve element via displacement of the valve actuator; and a plurality of actuator modules, each actuator module comprising a control unit collocated with an actuator, wherein at least one actuator module of the plurality of actuator modules is located in a high temperature environment having a temperature that exceeds a temperature rating of the at least one actuator module.

12. The fluid system of claim 11, wherein each actuator of the plurality of actuators is coupled to a variable geometry component, and wherein displacement of the actuator varies a position of the variable geometry component.

13. The fluid system of claim 11, further comprising:

an auxiliary drive rotationally coupled to the auxiliary pump, wherein the auxiliary drive includes an electric machine.

14. The fluid system of claim 11, further comprising:

a fluid source fluidly connected to the inlet line;

a return line fluidly connected to the fluid source; and an actuator discharge fluidly connecting outlets of the plurality of actuators to the return line.

15. The fluid system of claim 14, further comprising:

a recirculation line fluidly connected to the boost line; and a selector valve that selectively connects the actuator discharge to the recirculation line and the return line.

16. The fluid system of 11, further comprising:

a control line fluidly connecting the control valve to the auxiliary pump;

a sensor configured to output a control pressure signal indicative of a fluid pressure within the control line; and a controller configured to vary a rotational speed of the auxiliary drive and the auxiliary pump based on the control pressure signal.

17. The fluid system of 16, wherein the controller varies the rotational speed of the auxiliary drive to maintain the pressure within the control line constant.

18. The fluid system of claim 1, further comprising:

a sensor configured to output a pump pressure signal indicative of a fluid pressure downstream of an outlet of the variable displacement pump; and a controller configured to vary a position of the valve element based on the pump pressure signal by selectively supplying fluid to the valve actuator.

* * * * *